US009959886B2

(12) United States Patent
Anhari et al.

(10) Patent No.: US 9,959,886 B2
(45) Date of Patent: May 1, 2018

(54) SPECTRAL COMB VOICE ACTIVITY DETECTION

(71) Applicant: Malaspina Labs (Barbados), Inc., Vancouver (CA)

(72) Inventors: Alireza Kenarsari Anhari, Vancouver (CA); Alexander Escott, Vancouver (CA); Pierre Zakarauskas, Vancouver (CA)

(73) Assignee: Malaspina Labs (Barbados), Inc., Vancouver (CA)

( * ) Notice: Subject to any disclaimer, the term of this patent is extended or adjusted under 35 U.S.C. 154(b) by 192 days.

(21) Appl. No.: 14/099,892

(22) Filed: Dec. 6, 2013

(65) Prior Publication Data

US 2015/0162021 A1 Jun. 11, 2015

(51) Int. Cl.

| | |
|---|---|
| ***G10L 15/00*** | (2013.01) |
| ***G10L 15/20*** | (2006.01) |
| ***G10L 21/00*** | (2013.01) |
| ***G10L 25/93*** | (2013.01) |
| ***G10L 25/78*** | (2013.01) |

(52) U.S. Cl.

CPC ........ *G10L 25/78* (2013.01); *G10L 2025/783* (2013.01); *G10L 2025/937* (2013.01)

(58) Field of Classification Search

None

See application file for complete search history.

(56) References Cited

U.S. PATENT DOCUMENTS 6,526,376 B1 * 2/2003 Villette .................. G10L 25/90 704/207
8,548,803 B2 * 10/2013 Bradley ................ H04R 29/00 704/200

(Continued)

FOREIGN PATENT DOCUMENTS

WO 2013142652 A2 9/2013
WO 2013142726 A1 9/2013

OTHER PUBLICATIONS

Extended European Search Report for corresponding EP Appl. No. 14196661.4-1901 dated Apr. 1, 2015.

(Continued)

*Primary Examiner* — Paras D Shah
*Assistant Examiner* — Thuykhanh Le
(74) *Attorney, Agent, or Firm* — Ronald Fernando

(57) ABSTRACT

The various implementations described enable voice activity detection and/or pitch estimation for speech signal processing in, for example and without limitation, hearing aids, speech recognition and interpretation software, telephony, and various applications for smartphones and/or wearable devices. In particular, some implementations include systems, methods and/or devices operable to detect voice activity in an audible signal by determining a voice activity indicator value that is a normalized function of signal amplitudes associated with at least two sets of spectral locations associated with a candidate pitch. In some implementations, voice activity is considered detected when the voice activity indicator value breaches a threshold value. Additionally and/or alternatively, in some implementations, analysis of the audible signal provides a pitch estimate of detectable voice activity.

31 Claims, 7 Drawing Sheets

(56) References Cited

U.S. PATENT DOCUMENTS

| | | | | |
|---|---|---|---|---|
| 2004/0158462 | A1* | 8/2004 | Rutledge | G10L 25/90 704/207 |
| 2004/0193407 | A1* | 9/2004 | Ramabadran | G10L 25/90 704/207 |
| 2006/0080088 | A1* | 4/2006 | Lee | G10L 25/90 704/207 |
| 2009/0119097 | A1* | 5/2009 | Master | G10H 1/0008 704/207 |
| 2009/0319262 | A1* | 12/2009 | Gupta | G10L 19/22 704/207 |
| 2010/0074451 | A1* | 3/2010 | Usher | H04R 25/70 381/58 |
| 2010/0211385 | A1* | 8/2010 | Sehlstedt | G10L 25/78 704/214 |
| 2011/0054910 | A1* | 3/2011 | Fujihara | G10L 15/265 704/278 |
| 2011/0282658 | A1* | 11/2011 | Wang | G10L 21/0272 704/208 |
| 2012/0010881 | A1* | 1/2012 | Avendano | G10L 21/0208 704/226 |
| 2012/0265526 | A1* | 10/2012 | Yeldener | G10L 25/84 704/233 |
| 2013/0166288 | A1* | 6/2013 | Gao | G10L 25/90 704/207 |
| 2013/0231923 | A1* | 9/2013 | Zakarauskas | G10L 21/0208 704/205 |
| 2013/0231924 | A1* | 9/2013 | Zakarauskas | G10L 21/02 704/207 |
| 2013/0231932 | A1* | 9/2013 | Zakarauskas | G10L 25/78 704/236 |
| 2013/0282369 | A1* | 10/2013 | Visser | G10L 21/0208 704/226 |
| 2013/0282373 | A1* | 10/2013 | Visser | G10L 21/0208 704/233 |
| 2014/0142927 | A1* | 5/2014 | Campbell | G10H 1/0091 704/201 |
| 2014/0337021 | A1* | 11/2014 | Kim | G10L 21/0208 704/228 |
| 2015/0032446 | A1* | 1/2015 | Dickins | G10L 25/78 704/233 |
| 2015/0032447 | A1* | 1/2015 | Gunawan | G10L 25/84 704/233 |
| 2015/0081283 | A1* | 3/2015 | Sun | G10L 25/78 704/205 |
| 2016/0019910 | A1* | 1/2016 | Faubel | G10L 21/0232 704/209 |

OTHER PUBLICATIONS

Huiqun Deng, et al., “Voiced-Unvoiced-Silence Speech Sound Classification Based on Unsupervised Learning”, Multimedia and Expo, 2007 IEEE International Conference, pp. 176-179.

* cited by examiner

SPECTRAL COMB VOICE ACTIVITY DETECTION

TECHNICAL FIELD

The present disclosure generally relates to speech signal processing, and in particular, to voice activity detection and pitch estimation in a noisy audible signal.

BACKGROUND

The ability to recognize and interpret voiced sounds of another person is one of the most relied upon functions provided by the human auditory system. However, spoken communication typically occurs in adverse acoustic environments including ambient noise, interfering sounds, background chatter and competing voices. Multi-speaker auditory environments are particularly challenging because a group of voices generally have similar average characteristics. Nevertheless, acoustic isolation of a target voice is a hearing task that unimpaired-hearing listeners are able to accomplish effectively. In turn, unimpaired-hearing listeners are able to engage in spoken communication in highly adverse acoustic environments. Hearing-impaired listeners have more difficulty recognizing and interpreting a target voice, even in favorable acoustic environments. The problem is exacerbated by previously available hearing aids, which are based on simply amplifying sound and improving listening comfort.

Previously available hearing aids typically utilize methods that improve sound quality in terms of simply amplifying sound and listening comfort. However, previously available signal processing techniques do not substantially improve speech intelligibility of a target voice beyond that provided by mere amplification of the entire signal. One reason for this is that it is particularly difficult using previously known signal processing techniques to adequately reproduce in real time the acoustic isolation function performed by an unimpaired human auditory system. Another reason is that previously available techniques that improve listening comfort actually degrade speech intelligibility by removing audible information.

The aforementioned problems stemming from inadequate electronic acoustic isolation are also often found in many machine listening applications, such as those utilized by mobile and non-mobile devices. For example, with respect to smartphones and wearable devices, the performance of voice encoders used for telephony and applications utilizing speech recognition typically suffers in acoustic environments that are even slightly adverse.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the aspects of various implementations are used to enable detecting voice activity in an audible signal, and/or are used to enable providing a pitch estimate of voice activity in an audible signal.

To those ends, some implementations include systems, methods and devices operable to detect voice activity in an audible signal by analyzing spectral locations associated with voiced sounds. More specifically, various implementations determine a voice activity indicator value that is a normalized function of signal amplitudes associated with at least two sets of spectral locations associated with a candidate pitch. In some implementations, voice activity is considered detected when the determined voice activity indicator value breaches a threshold value. Additionally and/or alternatively, in some implementations, analysis of the audible signal provides a pitch estimate of voice activity in an audible signal.

Some implementations include a method of detecting voice activity in an audible signal. In some implementations, the method includes generating a first value associated with a first plurality of frequencies in an audible signal, wherein each of the first plurality of frequencies is a multiple of a candidate pitch; generating a second value associated with a second plurality of frequencies in the audible signal, wherein each of the second plurality of frequencies is associated with a corresponding one of the first plurality of frequencies; and generating a first voice activity indicator value as a function of the first and second values.

In some implementations, the candidate pitch is an estimation of a dominant frequency characterizing a corresponding series of glottal pulses associated with voiced sounds. In some implementations, one or more of the second plurality of frequencies is characterized by a frequency offset relative to a corresponding one of the first plurality of frequencies. In some implementations, the method also includes receiving the audible signal from one or more audio sensors. In some implementations, the method also includes comprising pre-emphasizing portions of a time series representation of the audible signal in order to adjust the spectral composition of the audible signal.

In some implementations, generating the first value includes calculating a first sum of a plurality of first amplitude spectrum values of the audible signal, wherein each of the plurality of first amplitude spectrum values is a corresponding amplitude of the audible signal at a respective one of the first plurality of frequencies. In some implementations, generating the second value includes calculating a second sum of a plurality of second amplitude spectrum values of the audible signal, wherein each of the plurality of second amplitude spectrum values is a corresponding amplitude of the audible signal at a respective one of the second plurality of frequencies. In some implementations, calculating at least one of the first and second sums includes calculating a respective weighted sum, wherein amplitude spectrums values are multiplied by respective weights. In some implementations, the respective weights are one of substantially monotonically increasing, substantially monotonically decreasing, substantially binary in order to isolate one or more spectral sub-bands, spectrum dependent, non-uniformly distributed, empirically derived, derived using a signal-to-noise metric, and substantially fit a probability distribution function.

In some implementations, generating the first voice activity indicator value includes normalizing a function of the difference between the first value and the second value. In some implementations, normalizing the difference between the first value and the second value comprises dividing the difference by a function of the sum of the first value and the second value. In some implementations, normalizing the difference between the first value and the second value comprises dividing the difference by a function of an integral value of the spectrum amplitude of the audible signal over a first frequency range that includes the candidate pitch.

In some implementations, the method also includes selecting the candidate pitch from a plurality of candidate pitches, wherein the plurality of candidate pitches are included in a frequency range associated with voiced sounds. In some implementations, the method also includes generating an additional respective voice activity indicator value for each of one or more additional candidate pitches, of the plurality of candidate pitches, in order to produce a plurality of voice activity indicator values including the first voice activity indicator value; and, selecting one of the plurality of candidate pitches based at least on one of the plurality of voice activity indicator values that is distinguishable from the others, wherein the selected one corresponds to one of the plurality of candidate pitches that is detectable in the audible signal. In some implementations, the distinguishable voice activity indicator value more closely satisfies a criterion than the other voice activity indicator values. In some implementations, one of the plurality of candidate pitches is selected for each of a plurality of temporal frames using a corresponding plurality of voice activity indicator values for each temporal frame. In some implementations, the selected one of the plurality of candidate voice frequencies provides an indicator of a pitch of a detectable voiced sound in the audible signal.

In some implementations, one or more additional voice activity indicator values are generated for a corresponding one or more additional temporal frames.

In some implementations, the method also includes comparing the first voice activity indicator value to a threshold level; and, determining that voice activity is detected in response to ascertaining that the first voice activity indicator value breaches the threshold level.

Some implementations include a method of detecting voice activity in a signal. In some implementations, the method includes generating a plurality of temporal frames of an audible signal, wherein each of the plurality of temporal frames includes a respective temporal portion of the audible signal; and, generating a plurality of voice activity indicator values corresponding to the plurality of temporal frames of the audible signal, each voice activity indicator values is determined by a function of a respective first and second spectrum characterization values associated with one or more multiples of a candidate pitch.

In some implementations, the method also includes determining whether or not voice activity is present in one or more of the plurality of temporal frames by evaluating one or more of the plurality of voice activity indicator values with respect to a threshold value.

In some implementations, the method also includes determining the function of the respective first and second values includes normalizing a function of the difference between the first value and the second value. In some implementations, the plurality of temporal frames sequentially span a duration of the audible signal.

In some implementations, the method also includes generating the respective first value associated with a first plurality of frequencies in the respective temporal frame of the audible signal, each of the first plurality of frequencies is a multiple of the candidate pitch; and, generating the respective second value associated with a second plurality of frequencies in the respective temporal frame of the audible signal, wherein each of one or more of the second plurality of frequencies is associated with a corresponding one of the first plurality of frequencies.

Some implementations include a voice activity detector including a processor and a non-transitory memory including instructions executable by the processor. In some implementations, the instructions, when executed by the processor, cause the voice activity detector to generate a first value associated with a first plurality of frequencies in an audible signal, each of the first plurality of frequencies is a multiple of a candidate pitch; generate a second value associated with a second plurality of frequencies in the audible signal, wherein each of one or more of the second plurality of frequencies is associated with a corresponding one of the first plurality of frequencies; and, generate a first voice activity indicator value as a function of the respective first value and the respective second value.

Some implementations include a voice activity detector including a windowing module configured to generate a plurality of temporal frames of an audible signal, wherein each temporal frame includes a respective temporal portion of the audible signal; and a signal analysis module configured to generate a plurality of voice activity indicator values corresponding to the plurality of temporal frames of the audible signal, each voice activity indicator values is determined by a function of a respective first and second spectrum characterization values associated with one or more multiples of a candidate pitch.

In some implementations, the voice activity detector also includes a decision module configured to determine whether or not voice activity is present in one or more of the plurality of temporal frames of the audible signal by evaluating one or more of the plurality of voice activity indicator values with respect to a threshold value. In some implementations, the voice activity detector also includes a frequency domain transform module configured to produce to a respective frequency domain representation of one or more of the plurality temporal frames of the audible signal. In some implementations, the voice activity detector also includes a spectral filter module configured to condition the respective frequency domain representation of one or more of the plurality temporal frames of the audible signal.

In some implementations, the signal analysis module is further configured to determine the function of the respective first value and the respective second value includes normalizing a function of the difference between the first value and the second value. In some implementations, the signal analysis module is also configured to calculate the respective first value associated with a first plurality of frequencies in the respective temporal frame of the audible signal, each of the first plurality of frequencies is a multiple of the candidate pitch; and, calculate the respective second value associated with a second plurality of frequencies in the respective temporal frame of the audible signal, wherein each of one or more of the second plurality of frequencies is associated with corresponding one of the first plurality of frequencies.

Some implementations include a voice activity detector including means for dividing an audible signal into a corresponding plurality of temporal frames, wherein each temporal frame includes a respective temporal portion of the audible signal; and means for generating a plurality of voice activity indicator values corresponding to the plurality of temporal frames of the audible signal, each voice activity indicator values is determined by a function of a respective first and second spectrum characterization values associated with one or more multiples of a candidate pitch.

Some implementations include a method of detecting voice activity in an audible signal. In some implementations, the method includes generating a first value associated with a first plurality of spectral components in an audible signal, wherein each of the first plurality of spectral components is associated with a respective multiple of a candidate pitch;

generating a second value associated with a second plurality of spectral components in the audible signal, wherein each of the second plurality of spectral components is associated with a corresponding one of the first plurality of spectral components; and, generating a first voice activity indicator value as a function of the first value and the second value.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
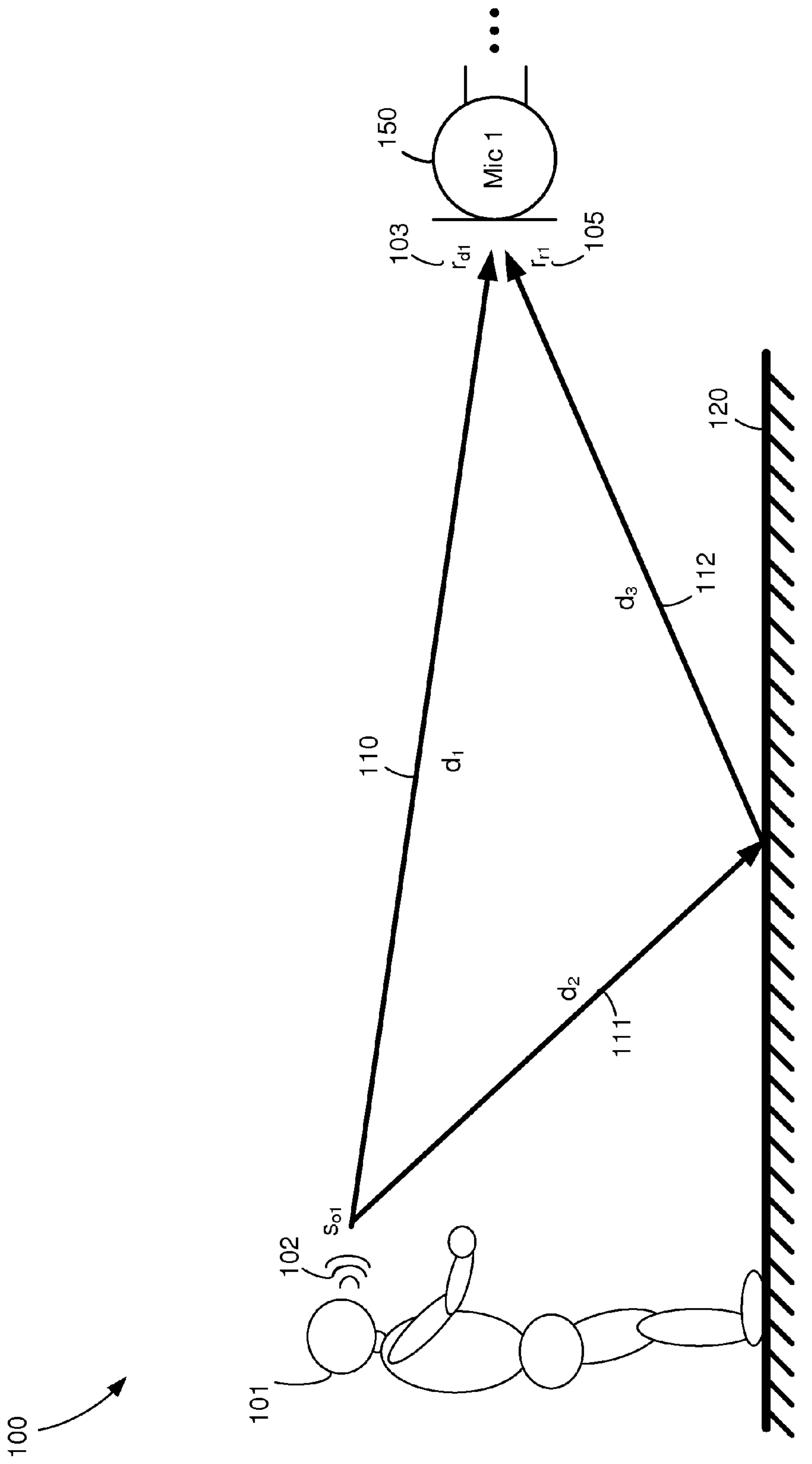
FIG. 1 is a schematic diagram of an example of a single speaker auditory scene in accordance with aspects of some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

The various implementations described herein enable voice activity detection and/or pitch estimation. Without limitation, various implementations are suitable for speech signal processing applications in, hearing aids, speech recognition and interpretation software, telephony, and various other applications associated with smartphones and/or wearable devices. In particular, some implementations include systems, methods and/or devices operable to detect voice activity in an audible signal by determining a voice activity indicator value that is a normalized function of signal amplitudes associated with at least two sets of spectral locations associated with a candidate pitch. In some implementations, voice activity is considered detected when the voice activity indicator value breaches a threshold value. Additionally and/or alternatively, in some implementations, analysis of an audible signal provides a pitch estimation of detectable voice activity.

Numerous details are described herein in order to provide a thorough understanding of the example implementations illustrated in the accompanying drawings. However, the invention may be practiced without many of the specific details. Well-known methods, components, and circuits have not been described in exhaustive detail so as not to unnecessarily obscure more pertinent aspects of the implementations described herein.

Briefly, the approach described herein includes analyzing at least two sets of spectral locations associated with a candidate pitch in order to determine whether an audible signal includes voice activity proximate the candidate pitch. Qualitatively, pitch of a voiced sound is a description of how high or low the voiced sound is perceived to be. Quantitatively, pitch is an estimation of a dominant frequency characterizing a corresponding series of glottal pulses associated with voiced sounds. Glottal pulses are an underlying component of voiced sounds and are created near the beginning of the human vocal tract. Glottal pulses are created when air pressure from the lungs is buffeted by the glottis, which periodically opens and closes. The resulting pulses of air excite the vocal tract, throat, mouth and sinuses which act as resonators, and the resulting voiced sounds have the same periodicity as a train of glottal pulses.

The duration of one glottal pulse is representative of the duration of one opening and closing cycle of the glottis, and the fundamental frequency ($f_0$) of a series of glottal pulses is approximately the inverse of the interval between two subsequent glottal pulses. The fundamental frequency of a train of glottal pulses typically dominates the perceived pitch of a voice. For example, a bass voice has a lower fundamental frequency than a soprano voice. A typical adult male will have a fundamental frequency of from 85 to 155 Hz, and that of a typical adult female ranges from 165 to 255 Hz. Children and babies have even higher fundamental frequencies. Infants show a range of 250 to 650 Hz, and in some cases go over 1000 Hz.

During speech, it is natural for the fundamental frequency to vary within a range of frequencies. Changes in the fundamental frequency are heard as the intonation pattern or melody of natural speech. Since a typical human voice varies over a range of fundamental frequencies, it is more accurate to speak of a person having a range of fundamental frequencies, rather than one specific fundamental frequency. Nevertheless, a relaxed voice is typically characterized by a natural (or nominal) fundamental frequency or pitch that is comfortable for that person. That is, the glottal pulses provide an underlying undulation to voiced speech corresponding to the pitch perceived by a listener. When an audible signal includes a voiced sound, the amplitude spectrum (S) of an audible signal typically exhibits a series of peaks at multiples of the fundamental frequency ($f_0$) of the voice.

FIG. 1 is a schematic diagram of an example of a single speaker auditory scene 100 provided to further explain the impact of reverberations on directly received sound signals. While certain specific features are illustrated, those skilled in the art will appreciate from the present disclosure that various other features have not been illustrated for the sake of brevity, and so as not to obscure more pertinent aspects of the implementations disclosed herein. To that end, the auditory scene 100 includes a first speaker 101, a microphone 150 positioned some distance away from the first speaker 101, and a floor surface 120, serving as a sound reflector. The first speaker 101 provides an audible speech signal ($s_{o1}$) 102, which is received by the microphone 150 along two different paths. The first path is a direct path between the first speaker 101 and the microphone 150, and includes a single path segment 110 of distance $d_1$. The second path is a reverberant path, and includes two segments 111, 112, each having a respective distance $d_2$, $d_3$. Those skilled in the art will appreciate that a reverberant path may have two or more segments depending upon the number of reflections the sound signal experiences en route to the listener or sound sensor. Merely for the sake of providing a simple example, the reverberant path discussed herein includes the two aforementioned segments 111, 112, which is the product of a single reflection off of the floor surface 120. Additionally, those skilled in the art will also appreciate that an acoustic environment often include two or more reverberant paths, and that only a single reverberant path has been illustrated from the sake of brevity and simplicity.

The signal received along the direct path, namely $r_{d1}$ (103), is referred to as the direct signal. The signal received along the reverberant path, namely $r_{r1}$ (105), is the reverberant signal. The audible signal received by the microphone 150 is the combination of the direct signal $r_{d1}$ and the reverberant signal $r_{r1}$. The distance, $d_1$, within which the amplitude of the direct signal $|r_d|$ surpasses that of the highest amplitude reverberant signal $|r_r|$ is known as the near-field. Within that distance the direct-to-reverberant ratio is typically greater than unity as the direct path signal dominates. This is where the glottal pulses of the first speaker 101 are prominent in the received audible signal. That distance depends on the size and the acoustic properties of the room the listener is in. In general, rooms having larger dimensions are characterized by longer cross-over distances, whereas rooms having smaller dimensions are characterized by smaller cross-over distances.

Figure 2:
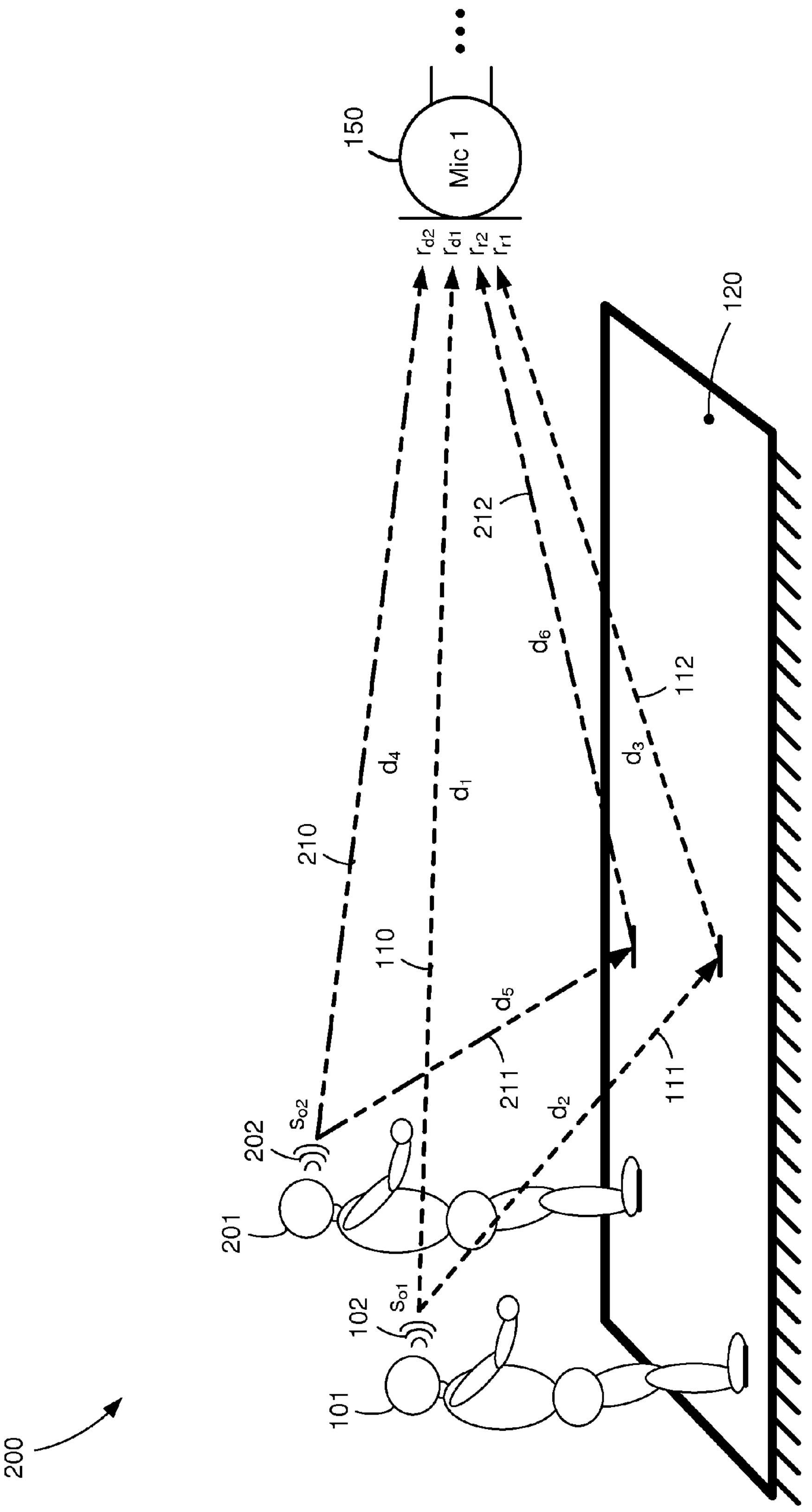
FIG. 2 is a schematic diagram of an example of a multi-speaker auditory scene in accordance with aspects of some implementations.

FIG. 2 is a schematic diagram of an example of a multi-speaker auditory scene 200 in accordance with aspects of some implementations. The auditory scene 200 illustrated in FIG. 2 is similar to and adapted from the auditory scene 100 illustrated in FIG. 1. Elements common to FIGS. 1 and 2 include common reference numbers, and only the differences between FIGS. 1 and 2 are described herein for the sake of brevity. Moreover, while certain specific features are illustrated, those skilled in the art will appreciate from the present disclosure that various other features have not been illustrated for the sake of brevity, and so as not to obscure more pertinent aspects of the implementations disclosed herein. To that end, the auditory scene 200 includes a second speaker 201 position away from the microphone 150 in a manner similar to the first speaker 101.

The second speaker 201 provides an audible speech signal ($s_{o2}$) 202. The audible speech signal ($s_{o2}$) 202 is received by the microphone 150 from two different paths, along with the aforementioned versions of the speech signal ($s_{o1}$) 102 provided by the first speaker 101. The first path is a direct path between the second speaker 201 and the microphone 150, and includes a single path segment 210 of distance $d_4$. The second path is a reverberant path, and includes two segments 211, 212, each having a respective distance $d_5$, $d_6$. Again, merely for the sake of example, the reverberant path discussed herein includes the two aforementioned segments 211, 212, which is the product of a single reflection off of the floor surface 120. The signal received along the direct path, namely $r_{d2}$, is referred to as the direct signal. The signal received along the reverberant path, namely $r_{r2}$, is the reverberant signal.

As compared to FIG. 1, the audible signal received by the microphone 150 in the auditory scene 200 represented in FIG. 2 is the combination of the direct and reverberant signals $r_{d1}$, $r_{r1}$ from the first speaker 101 and the direct and reverberant signals $r_{d2}$, $r_{r2}$ from the second speaker 201. When both the first and second speakers 101, 201 are located in respective near-fields, the respective direct signal $r_{d1}$, $r_{d2}$ received with a greater amplitude will dominate the other at the microphone 150. However, the direct signal $r_{d1}$, $r_{d2}$ with the lower amplitude may also be heard depending on the relative amplitudes. Depending on the situation, one of the two direct signals $r_{d1}$, $r_{d2}$ will be that of the target voice.

As noted above, when an audible signal includes a voiced sound, the amplitude spectrum (S) of an audible signal typically exhibits a series of peaks at multiples of the fundamental frequency ($f_0$) of the voice. Where the voice harmonics dominate the noise and interference (e.g., including reverberant path and multiple speaker interference), there are typically amplitude peaks at spectral locations associated with harmonics $f_0$, $2f_0$, $3f_0$, . . . , $Nf_0$ of the fundamental frequency ($f_0$) of the voiced sounds.

Figure 3:
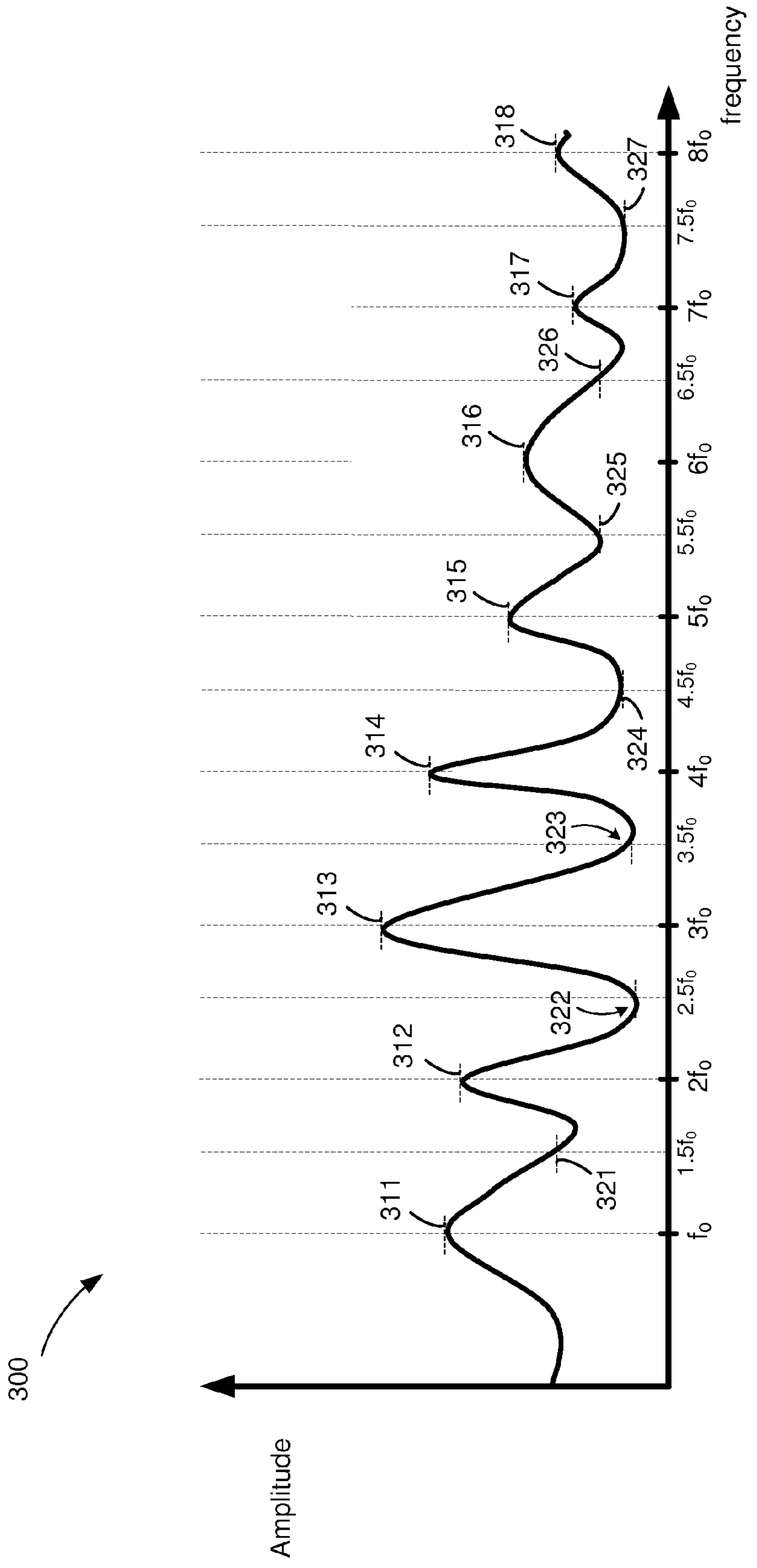
FIG. 3 is a simplified frequency domain representation of an audible signal shown with spectral analysis points in accordance with aspects of some implementations.

As an example, FIG. 3 is a simplified frequency domain representation (i.e., amplitude spectrum) of an audible signal 300 shown with spectral analysis points in accordance with aspects of some implementations. More specifically, FIG. 3 shows a first set of analysis points 311, 312, 313, 314, 315, 316, 317, 318 (i.e., 311 to 318) associated with a corresponding first plurality of frequencies, and a second set of analysis points 321, 322, 323, 324, 325, 326, 327 (i.e., 321 to 327) at a corresponding second plurality of frequencies. The first plurality of frequencies include at least some of the harmonics $f_0$, $2f_0$, $3f_0$, . . . , $Nf_0$ of the fundamental frequency $f_0$ of a voice signal included in the audible signal 300. Each of the second plurality of frequencies is associated with a corresponding one of the first plurality of frequencies. As shown in FIG. 3, for example, each of the second plurality of frequencies is located at the midway point between an adjacent two of the first plurality of frequencies. In some implementations, one or more of the second plurality of frequencies is characterized by a frequency offset relative to a corresponding one of the first plurality of frequencies.

Figure 4:
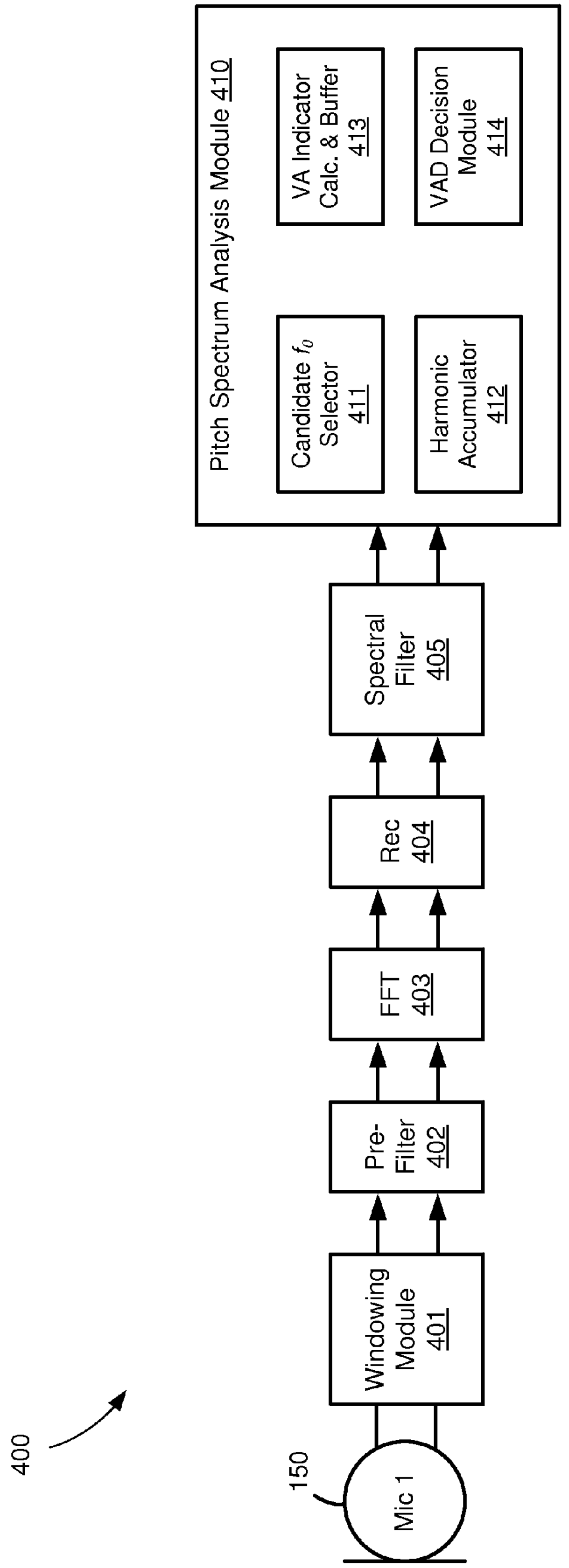
FIG. 4 is a block diagram of a voice activity and pitch estimation system in accordance with some implementations.

FIG. 4 is a block diagram of a voice activity and pitch estimation system 400 in accordance with some implementations. While certain specific features are illustrated, those skilled in the art will appreciate from the present disclosure that various other features have not been illustrated for the sake of brevity and so as not to obscure more pertinent aspects of the example implementations disclosed herein. To that end, as a non-limiting example, in some implementations the voice activity and pitch estimation system 200 includes a windowing module 401 connectable to the aforementioned microphone 150, a pre-filtering stage 402, a Fast Fourier Transform (FFT) module 403, a rectifier module 404, a spectral filtering module 405, and a pitch spectrum analysis module 410.

In some implementations, the voice activity and pitch estimation system 400 is configured for utilization in a hearing aid or any suitable computer device, such as a computer, a laptop computer, a tablet device, a netbook, an internet kiosk, a personal digital assistant, a mobile phone, a smartphone, a wearable device, and a gaming device. Briefly, as described in more detail below with reference to FIGS. 5 and 6, in operation the voice activity and pitch estimation system 400 seeks to detect voice activity in an audible signal by determining a normalized difference between first and second values associated with at least some of the harmonics $f_0$, $2f_0$, $3f_0$, . . . , $Nf_0$ of a candidate pitch $f_0 \in F=\{f_{min} \rightarrow f_{max}\}$. In some implementations, the first value includes the sum of a set of first amplitude spectrum values of the audible signal at corresponding multiples of a candidate pitch $f_0$. In some implementations, the second value includes the sum of a set of second amplitude spectrum values of the audible signal at corresponding frequencies that are different from the multiples of the candidate pitch $f_0$. In some implementations, voice activity is detected when the normalized difference breaches a threshold value ($M_t$). In some implementations, a "soft" output of the voice activity and pitch estimation system 400 is used as an input to one or more systems or methods configured to determine a result from a suitable combination of one or more soft and hard inputs, such as a neural net. In some implementations, a "soft" output includes for example, a normalized difference determined as described above, a sigmoid function, and one or more stochastic variables.

To that end, the microphone 150 (i.e., one or more audio sensors) is provided to receive an audible signal. In many applications, a received audible signal is an ongoing or continuous time series. In turn, in some implementations, the windowing module 401 is configured to generate two or more temporal frames of the audible signal. Each temporal frame of the audible signal includes a temporal portion of the audible signal. Each temporal frame of the audible signal is optionally conditioned by the pre-filter 402. For example, in some implementations, pre-filtering includes band-pass filtering to isolate and/or emphasize the portion of the frequency spectrum associated with human speech. In some implementations, pre-filtering includes pre-emphasizing portions of one or more temporal frames of the audible signal in order to adjust the spectral composition of the one or more temporal frames audible signal. Additionally and/or alternatively, in some implementations, pre-filtering includes filtering the received audible signal using a low-noise amplifier (LNA) in order to substantially set a noise floor. As such, in some implementations, a pre-filtering LNA is arranged between the microphone 150 and the windowing module 401. Those skilled in the art will appreciate that numerous other pre-filtering techniques may be applied to the received audible signal, and those discussed are merely examples of numerous pre-filtering options available.

In turn, the FFT module 403 converts each of the temporal frames into a corresponding frequency domain representation so that the spectral amplitude of the audible signal can be subsequently obtained for each temporal frame. In some implementations, the frequency domain representation of a temporal frame includes at least one of a plurality of sub-bands contiguously distributed throughout the frequency spectrum associated with voiced sounds. In some implementations, a 32 point short-time FFT is used for the conversion. However, those skilled in the art will appreciate that any number of FFT implementations may be used. Additionally and/or alternatively, the FFT module 403 may be replaced with any suitable implementation of one or more low pass filters, such as for example, a bank of IIR filters.

The rectifier module 404 is configured to produce an absolute value (i.e., modulus value) signal from the output of the FFT module 403 for each temporal frame.

In some implementations, the spectral filter module 405 is configured to adjust the spectral composition of the one or more temporal frames of the audible signal in the frequency domain. For example, in some implementations, the spectral filter module 405 is configured to one of emphasize, deemphasize, and isolate one or more spectral components of a temporal frame of the audible signal in the frequency domain.

In some implementations, the pitch spectrum analysis module 410 is configured to seek an indication of voice activity in one or more of the temporal frames of the audible signal. To that end, the pitch spectrum analysis module 410 is configured to: generate a first value associated with a first plurality of frequencies in an audible signal, where each of the first plurality of frequencies is a multiple of a candidate pitch; generate a second value associated with a second plurality of frequencies in the audible signal, where each of the second plurality of frequencies is associated with a corresponding one of the first plurality of frequencies; and generate a first voice activity indicator value as a function of the first value and the second value. To these ends, in some implementations, the pitch spectrum analysis module 410 includes a candidate pitch selection module 411, a harmonic accumulator module 412, a voice activity indicator calculation and buffer module 413, and a voice activity detection decision module 414. Those of ordinary skill in the art will appreciate from the present disclosure that the functions of the four aforementioned modules can be combined into one or more modules and/or further sub-divided into additional modules; and, that the four aforementioned modules are provided as merely one example configuration of the various aspect and functions described herein.

In some implementations, the candidate pitch selection module 411 is configured to select a candidate pitch $f_0$ from a plurality of candidate pitches ($f_0 \in F=\{f_{min} \rightarrow f_{max}\}$). In some implementations, the voice activity and pitch estimation system 400 is configured to search for voice activity in an audible signal by evaluating one or more temporal frames of the audible signal for each of a set of candidate pitches, $F=\{f_{min} \rightarrow f_{max}\}$. In some implementations, voice activity is detected based at least in part on determining that at least one voice activity indicator value for a corresponding candidate pitch is above a threshold value ($M_t$). In some implementations, the corresponding candidate pitch is also the candidate pitch that results in a respective voice activity indicator value that is distinct from the others. In some implementations, the plurality of candidate pitches are included in a frequency range associated with voiced sounds. In some implementations, the set of candidate pitches, F, is pre-calculated or pre-determined. In some implementations, the plurality of candidate pitches include pitches that are produced by non-voiced sounds, such as musical instruments and electronically produced sounds.

In some implementations, the harmonic accumulator module 412 is configured to generate a first value $X_1$ and a second value $X_2$ by generating respective first and second sums of amplitude spectrum values for a candidate pitch $f_0$. More specifically, as provided in equation (1) below, the first value $X_1$ is a sum of a plurality of first amplitude spectrum values $\{S(if_0)\}$ of the audible signal:

$$X_1=\Sigma_{i=1}^{N} S(if_0) \tag{1}$$

Each of the plurality of first amplitude spectrum values $\{S(if_0)\}$ is a corresponding amplitude of the audible signal at a respective one of the first plurality of frequencies $\{if_0\}$, $i \in I=\{1, 2, \ldots, N\}$. Equation (1) can be further generalized as follows:

$$X_1=\Sigma_{i=1}^{N} S^n(if_0) \tag{1.1}$$

where n is an exponent. When n=2, $S^n(f)$ is the spectrum power at frequency f. When n=1, $S^n(f)$ is the spectrum amplitude at frequency f. Other values for the exponent n are also possible, including non-integer values.

Similarly, in some implementations, the second value $X_2$ is a sum of a plurality of second amplitude spectrum values of the audible signal. Each of the plurality of second amplitude spectrum values $\{S(if)\}$ is a corresponding amplitude of the audible signal at a respective one of the second plurality of frequencies associated with candidate pitch $f_0$. In some implementations, as shown in FIG. 3, for example, each of the second plurality of frequencies is located at approximately the midway point between an adjacent two of the first plurality of frequencies, and the second value $X_2$ is determined according to equation (2) as follows:

$$X_2=\Sigma_{i=1}^{N}S((i+0.5)f_0) \quad (2)$$

Equation (2) can also be further generalized in a manner similar to equation (1.1) provided above. In some implementations, one or more of the second plurality of frequencies is characterized by a frequency offset relative to a corresponding one of the first plurality of frequencies.

In some implementations, calculating at least one of the first and second sums includes calculating a respective weighted sum. For example, amplitude spectrums values for each of the first and second sums are multiplied by respective set of weights $\{W_{1,i}\}$ and $\{W_{2,i}\}$ prior to adding them together as provided in equations (3.1) and (3.2) as follows:

$$X_1=\Sigma_{i=1}^{N}W_{1,i}S(if_0) \quad (3.1)$$

$$X_2=\Sigma_{i=1}^{N}W_{2,i}S((i=0.5)f_0) \quad (3.2)$$

In some implementations, the respective weights are one of substantially monotonically increasing, substantially monotonically decreasing, substantially binary in order to isolate one or more spectral sub-bands, spectrum dependent, non-uniformly distributed, empirically derived, derived using a signal-to-noise metric (e.g., provided by a complementary signal tracking module), and substantially fit a probability distribution function. In some implementations, the sets of weights $\{W_{1,i}\}$ and $\{W_{2,i}\}$ are substantially equivalent. In some implementations, the sets of weights $\{W_{1,i}\}$ and $\{W_{2,i}\}$ include at least one weight that is different from a corresponding weight in the other set.

In some implementations, the voice activity indicator calculation and buffer module 413 is configured to generate a voice activity indicator value as a function of the first and second values generated by the harmonic accumulator 412. In particular, the difference between $X_1$ and $X_2$ is indicative of the presence of voice activity at the candidate pitch $f_0$. In some implementations, the impact of the relative amplitude of the audible signal (i.e., how loud the audible signal is) is reduced by normalizing the difference between $X_1$ and $X_2$. Accordingly, in some implementations, generating a voice activity indicator includes normalizing a function of the difference between the first value and the second value.

Several candidates are acceptable for use as a normalizing factor. In some implementations, normalizing the difference between the first value and the second value comprises one of: dividing the difference by a function of the sum of the first value and the second value; and dividing the difference by a function of an integral value of the spectrum amplitude of the audible signal over a first frequency range that includes the candidate pitch. Referring to equation (4), for example, the use of a sum of $X_1$ and $X_2$ as normalizing factor would lead to statistic $M_1$ for each candidate pitch $f_0$:

$$M_1(f_0)=\frac{X_1-X_2}{X_1+X_2} \quad (4)$$

Another possibility for the normalizing factor, provided in equation (5), is the sum of $S^n$ over the frequency range over which the calculation takes place, from a minimum candidate pitch ($f_{min}$) to N times the maximum candidate pitch ($f_{max}$) (i.e., $F_{min}$=min($f_0$); $F_{max}$=Nmax($f_0$)); $f_0 \in F=\{f_{min}\rightarrow f_{max}\}$):

$$M_2(f_0)=\frac{X_1-X_2}{\int_{F_{min}}^{F_{max}}S^n\,dS} \quad (5)$$

In some implementations, the voice activity detection decision module 414 is configured to determine using the voice activity indicator whether or not voiced sound is present in the audible signal, and provides an indicator of the determination. For example, voice activity detection decision module 414 makes the determination by assessing whether or not the first voice activity indicator value breaches a threshold level ($M_t$). In some implementations, a soft state of the voice activity indicator is used by one or more other systems and methods. Additionally and/or alternatively, in some implementations, temporal analysis of the voice activity indicator (or its soft state) is used by one or more other systems and methods (e.g., the time average of the voice activity indicator taken across two or more frames).

Figure 5:
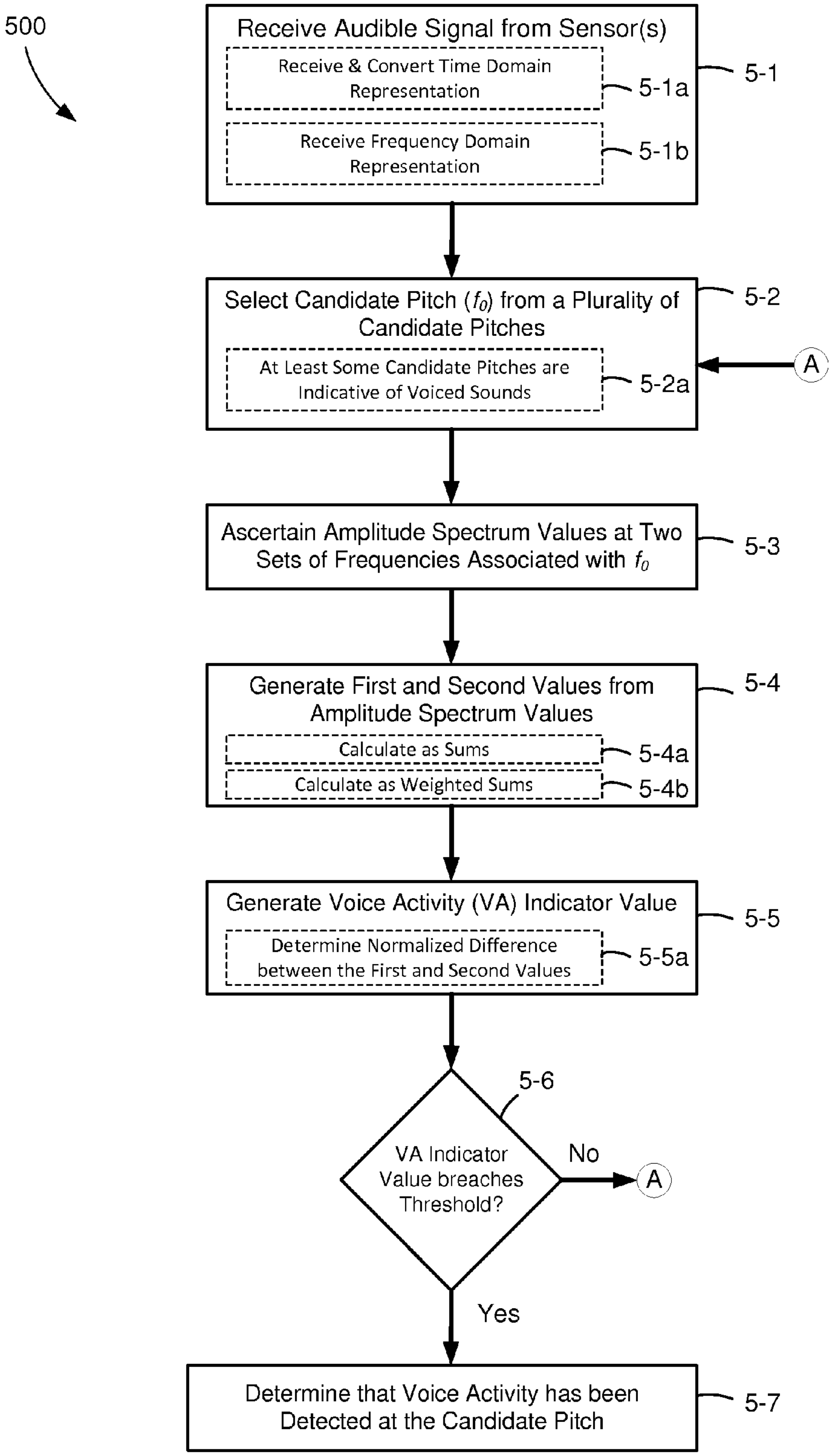
FIG. 5 is a flowchart representation of a method of voice activity detection in accordance with some implementations.

FIG. 5 is a flowchart representation of a method 500 of voice activity detection in accordance with some implementations. In some implementations, the method 500 is performed by a voice activity detection system in order to provide a voice activity signal based at least on the identification and analysis of regularly-spaced spectral components generally characteristic of voiced speech. Briefly, the method 500 includes receiving an audible signal, and determining a normalized difference between first and second values associated with at least some of the harmonics $f_0$, $2f_0$, $3f_0$, . . . , $Nf_0$ in the audible signal for each of one or more candidate pitches $f_0 \in F=\{f_{min}\rightarrow f_{max}\}$.

To that end, as represented by block 5-1, the method 500 includes receiving the audible signal from one or more audio sensors. In some implementations, as represented by block 5-1*a*, receiving the audible signal includes receiving a time domain audible signal (i.e., a time series) from a microphone and converting the time domain audible signal into the frequency domain. In some implementations, as represented by block 5-1*b*, receiving the audible signal includes receiving a frequency domain representation of the audible signal, from for example, another device and/or a memory location.

As represented by block 5-2, the method 500 includes selecting a candidate pitch $f_0$ from a plurality of candidate pitches ($f_0 \in F=\{f_{min}\rightarrow f_{max}\}$). As presented by block 5-2*a*, at least some of the candidate pitches are included in a frequency range associated with voiced sounds. In some implementations, the set of candidate pitches, F, is pre-calculated or pre-determined. In some implementations, the plurality of candidate pitches include pitches that are produced by non-voiced sounds, such as musical instruments and electronically produced sounds.

As represented by block 5-3, the method 500 includes ascertaining the amplitude spectrum values of the audible signal at two sets of frequencies associated with the selected candidate pitch $f_0$. In some implementations, the first set of frequencies includes multiples $f_0$, $2f_0$, $3f_0$, . . . , $Nf_0$ of the selected candidate pitch $f_0$, and each of the second set of frequencies is associated with a corresponding one of the first plurality of frequencies, as described above. As represented by block 5-4, the method 500 includes generating respective first and second values ($X_1$, $X_2$) associated with the ascertained amplitude spectrum values for a candidate pitch $f_0$. In some implementations, as represented by block 5-4*a*, the first value $X_1$ and the second value $X_2$ are generated by calculating respective first and second sums of amplitude spectrum values, as for example, described above with reference to equations (1) and (2). In some implementations, as represented by block 5-4*b*, the first value $X_1$ and the second value $X_2$ are generated by calculating respective first and second weighted sums of amplitude spectrum values, as for example, described above with reference to equations (3.1) and (3.2).

As represented by block 5-5, the method 500 includes generating a voice activity indicator value as a function of the first and second values ($X_1$, $X_2$). In particular, the difference between $X_1$ and $X_2$ provides an indicator for the presence of voice activity at the candidate pitch $f_0$. In some implementations, as represented by block 5-5*a*, the impact of the relative amplitude of the audible signal (i.e., how loud the audible signal is) is reduced by normalizing the difference between the first value $X_1$ and the second value $X_2$. Accordingly, in some implementations, generating a voice activity indicator includes normalizing a function of the difference between the first value and the second value.

As represented by block 5-6, the method 500 includes determining if the generated voice activity indicator value breaches a threshold value ($M_t$). If the generated voice activity indicator value does not breach the threshold level ("No" path from block 5-6), the method 500 circles back to the portion of the method represented by block 5-2, where a new candidate pitch is selected for evaluation. On the other hand, if the generated voice activity indicator value breaches the threshold level ("Yes" path from block 5-6), as represented by block 5-7, the method 500 includes determining that voice activity has been detected at the selected candidate pitch. In some implementations, such a determination is accompanied by a signal that voice activity has been detected, such as setting a flag and/or signaling the result to another device or module. Additionally and/or alternatively, additional candidate pitches are selected for evaluation even when voice activity is detected at an already selected candidate pitch. In some such implementations, the one or more candidate pitches that reveal distinguishable voice activity indicator values are selected as providing indicators of detected voiced sounds in the audible signal.

Figure 6:
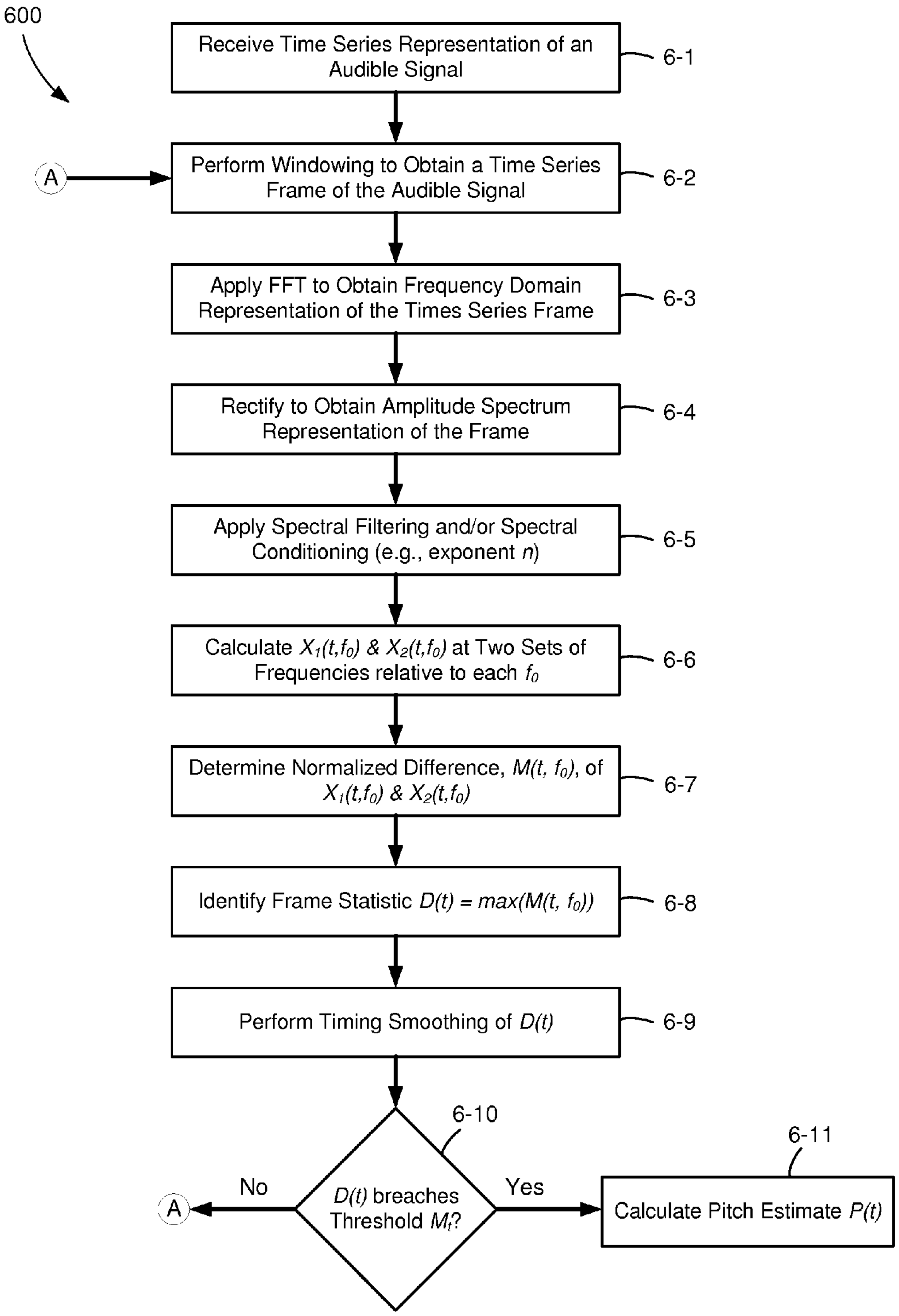
FIG. 6 is a flowchart representation of a method of voice activity detection and pitch estimation is accordance with some implementations.

FIG. 6 is a flowchart representation of a method 600 of voice activity detection and pitch estimation is accordance with some implementations. In some implementations, the method 600 is performed by a voice activity detection system in order to provide a voice activity signal based at least on the identification of regularly-spaced spectral components generally characteristic of voiced speech. Briefly, the method 600 includes dividing an audible signal into two or more temporal frames, and determining a normalized difference between first and second values associated with at least some of the harmonics $f_0$, $2f_0$, $3f_0$, . . . , $Nf_0$ in one or more of the temporal frames of the audible signal for each of one or more candidate pitches $f_0 \in F=\{f_{min} \rightarrow f_{max}\}$.

To that end, as represented by block 6-1, the method 600 includes receiving a time series representation of an audible signal. As represented by block 6-2, the method 600 includes performing a windowing operation to obtain a temporal frame or portion of the audible signal for time t. In other words, a portion of the audible is selected or obtained for further analysis. As represented by block 6-3, the method 600 includes applying a Fast Fourier Transform (FFT) or the like to obtain the frequency domain representation of the temporal frame of the audible signal. As represented by block 6-4, the method 600 includes rectifying the frequency domain representation to obtain the spectrum amplitude representation of the temporal frame of the audible signal. As represented by block 6-5, the method 600 includes applying one of spectral filtering and/or spectral conditioning to the spectrum amplitude representation of the temporal frame of the audible signal. For example, in some implementations, spectral filtering and/or spectral conditioning include both linear and non-linear operations. In some implementations, the use of weighted sums is an example of a linear operation. In some implementations, non-linear operations include operations such as, and without limitation, noise subtraction, pre-whitening, and determining an exponent function associated with the spectrum representation of at least a portion of the audible signal.

As represented by block 6-6, the method 600 includes calculating a respective first value $X_1(t, f_0)$ and a respective second value $X_2(t, f_0)$ by generating respective first and second sums of amplitude spectrum values for each of one or more candidate pitches $f_0 \in F=\{f_{min} \rightarrow f_{max}\}$ for the temporal frame of the audible signal obtained for time t. As represented by block 6-7, the method 600 includes determining the corresponding normalized difference $M(t,f_0)$ for the respective first and second values ($X_1(t, f_0)$, $X_2(t, f_0)$) for each of one or more candidate pitches $f_0 \in F=\{f_{min} \rightarrow f_{max}\}$ for the temporal frame of the audible signal obtained for time t. As represented by block 6-8, the method 600 includes identifying a frame statistic D(t) as a function of the calculated normalized differences. For example, as shown in FIG. 6, in some implementation, the frame statistic D(t) includes the normalized difference having the highest value in the calculated set of normalized differences (e.g. $D(t)=\max(M(t,f_0))$, $f_0 \in F=\{f_{min} \rightarrow f_{max}\}$).

As represented by block 6-9, the method 600 includes performing a timing smoothing operation on the frame statistics $\{D(t)\}$. In some implementations, time smoothing is used to decrease the variance of the pitch P(t) and statistics D(t) by utilizing the continuity of human voice characteristics over time. In some implementations, this is done by smoothing the trajectories of D(t) and P(t) over time by tracking in one of several ways. For example, some implementations include applying pitch P(t) and the frame statistic D(t) through a running median filter. Other implementations include, without limitation, Kalman filters and leaky integrators. In some implementations, heuristics associated with pitch trajectories are used to smooth the frame statistics $\{D(t)\}$. For example, in some implementations, the rate of change of the detected pitch between frames is limited, except for pitch doubling or pitch halving which can occur because of ambiguities in pitch values.

As represented by block 6-10, the method 600 includes determining if the frame statistic D(t) breaches a threshold value $M_t$. If the frame statistic D(t) does not breach the threshold level ("No" path from block 6-10), the method 600 circles back to the portion of the method represented by block 6-2, where another temporal frame is selected or obtained for evaluation at time t+1 (and so on). On the other hand, if the frame statistic D(t) value breaches the threshold level ("Yes" path from block 6-10), as represented by block 6-11, the method 600 includes calculating a pitch estimate P(t) for the temporal frame of the audible signal at time t. In some implementations, calculating the pitch estimate P(t) is accompanied by setting a flag and/or signaling the result to another device or module. Additionally and/or alternatively, additional temporal frames are selected or obtained for evaluation even when voice activity is detected in the current temporal frame of the audible signal. In some such implementations, the one or more candidate pitches that reveal distinguishable voice activity indicator values are selected as providing indicators of detected voiced sounds in the audible signal.

Figure 7:
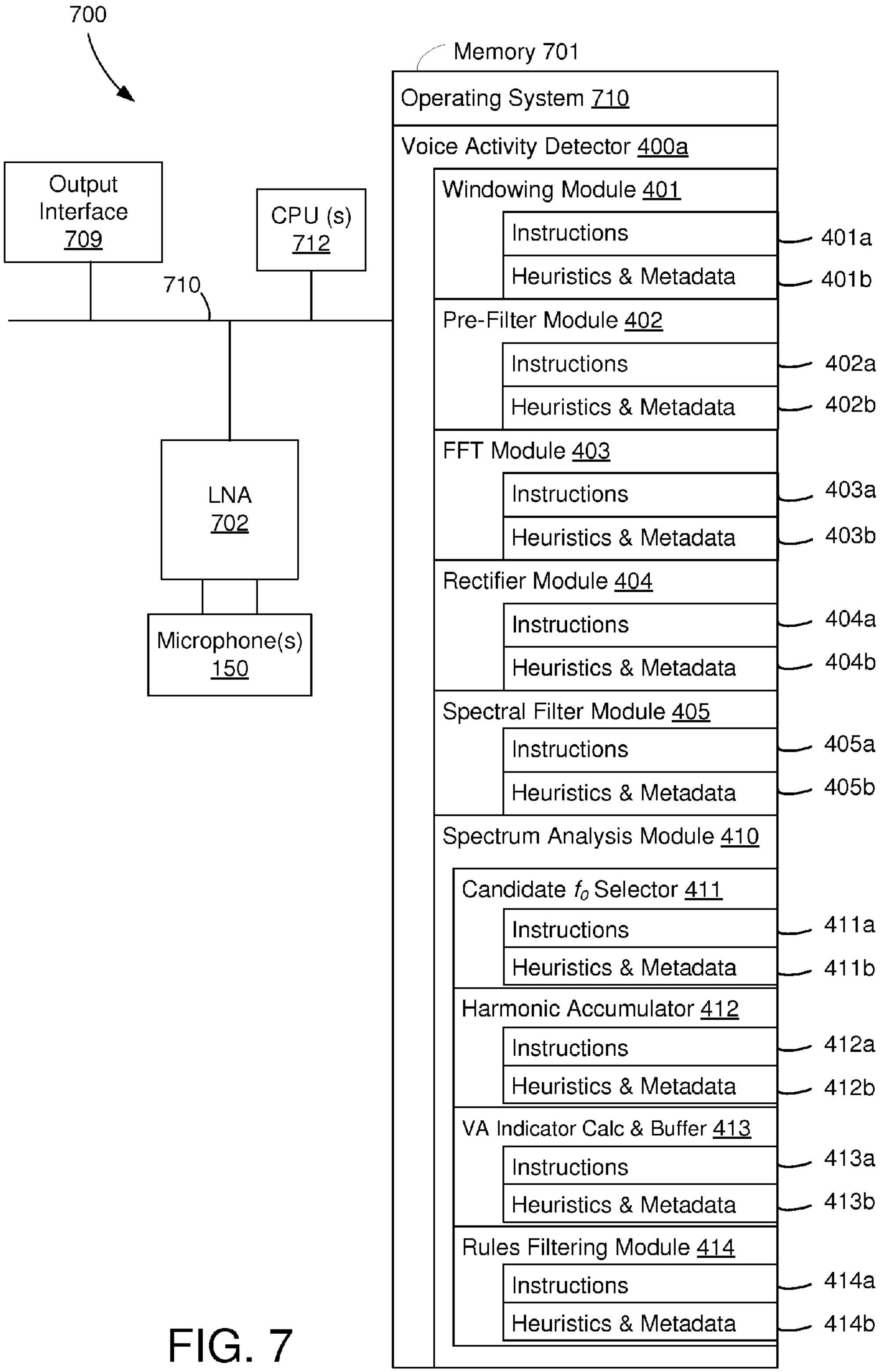
FIG. 7 is a block diagram of a voice activity detection and pitch estimation device in accordance with some implementations.

FIG. 7 is a block diagram of a voice activity detection and pitch estimation 700 device in accordance with some implementations. The voice activity and pitch estimation system 700 illustrated in FIG. 7 is similar to and adapted from the voice activity and pitch estimation system 400 illustrated in FIG. 4. Elements common to both implementations include common reference numbers, and only the differences between FIGS. 4 and 7 are described herein for the sake of brevity. Moreover, while certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the voice activity and pitch estimation system 700 includes one or more processing units (CPU's) 712, one or more output interfaces 709, a memory 701, the low-noise amplifier (LNA) 702, one or more microphones 150, and one or more communication buses 210 for interconnecting these and various other components not illustrated for the sake of brevity.

The communication buses 710 may include circuitry that interconnects and controls communications between system components. The memory 701 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 701 may optionally include one or more storage devices remotely located from the CPU(s) 712. The memory 701, including the non-volatile and volatile memory device(s) within the memory 301, comprises a non-transitory computer readable storage medium. In some implementations, the memory 701 or the non-transitory computer readable storage medium of the memory 701 stores the following programs, modules and data structures, or a subset thereof including an optional operating system 710, the windowing module 401, the pre-filter module 402, the FFT module 403, the rectifier module 404, the spectral filtering module 405, and the pitch spectrum analysis module 410.

The operating system 710 includes procedures for handling various basic system services and for performing hardware dependent tasks.

In some implementations, the windowing module 401 is configured to generate two or more temporal frames of the audible signal. Each temporal frame of the audible signal includes a temporal portion of the audible signal. To that end, in some implementations, the windowing module 401 includes a set of instructions 401*a* and heuristics and metadata 401*b*.

In some implementations, the optional pre-filtering module 402 is configured to band-pass filter, isolate and/or emphasize the portion of the frequency spectrum associated with human speech. In some implementations, pre-filtering includes pre-emphasizing portions of one or more temporal frames of the audible signal in order to adjust the spectral composition of the one or more temporal frames audible signal. To that end, in some implementations, the pre-filtering module 402 includes a set of instructions 402*a* and heuristics and metadata 402*b*.

In some implementations, the FFT module 403 is configured to convert an audible signal, received by the microphone 150, into a frequency domain representation so that the spectral amplitude of the audible signal can be subsequently obtained for each temporal frame of the audible signal. As noted above, in some implementations, each temporal frame of the received audible signal is pre-filtered by pre-filter 402 prior to conversion into the frequency domain by the FFT module 403. To that end, in some implementations, the FFT module 403 includes a set of instructions 403*a* and heuristics and metadata 403*b*.

In some implementations, the rectifier module 404 is configured to produce an absolute value (i.e., modulus value) signal from the output of the FFT module 403 for each temporal frame. To that end, in some implementations, the rectifier module 404 includes a set of instructions 404*a* and heuristics and metadata 404*b*.

In some implementations, the spectral filter module 405 is configured to adjust the spectral composition of the one or more temporal frames of the audible signal in the frequency domain. For example, in some implementations, the spectral filter module 405 is configured to one of emphasize, deemphasize, and isolate one or more spectral components of a temporal frame of the audible signal in the frequency domain. To that end, in some implementations, the spectral filter module 405 includes a set of instructions 405*a* and heuristics and metadata 405*b*.

In some implementations, the pitch spectrum analysis module 410 is configured to seek an indication of voice activity in one or more of the temporal frames of the audible signal. To these ends, in some implementations, the pitch spectrum analysis module 410 includes a candidate pitch selection module 411, a harmonic accumulator module 412, a voice activity indicator calculation and buffer module 413, and a voice activity detection decision module 414. Those of ordinary skill in the art will appreciate from the present disclosure that the functions of the four aforementioned modules can be combined into one or more modules and/or further sub-divided into additional modules; and, that the four aforementioned modules are provided as merely one example configuration of the various aspect and functions described herein.

In some implementations, the candidate pitch selection module 411 is configured to select a candidate pitch $f_0$ from a plurality of candidate pitches ($f_0 \in F=\{f_{min} \rightarrow f_{max}\}$). To that end, in some implementations, the candidate pitch selection module 411 includes a set of instructions 411*a* and heuristics and metadata 411*b*.

In some implementations, the harmonic accumulator module 412 is configured to generate a first value $X_1$ and a second value $X_2$ by generating respective first and second sums of amplitude spectrum values for a candidate pitch $f_0$, as described above. In some implementations, the harmonic accumulator module 412 is also configured to ascertain amplitude spectrum values of the audible signal at two sets of frequencies associated with the selected candidate pitch $f_0$. To that end, in some implementations, the harmonic accumulator module 412 includes a set of instructions 412*a* and heuristics and metadata 412*b*.

In some implementations, the voice activity indicator calculation and buffer module 413 is configured to generate a voice activity indicator value as a function of the first and second values generated by the harmonic accumulator 412. In particular, the difference between $X_1$ and $X_2$ is indicative of the presence of voice activity at the candidate pitch $f_0$. In some implementations, the impact of the relative amplitude of the audible signal (i.e., how loud the audible signal is) is reduced by normalizing the difference between $X_1$ and $X_2$. Accordingly, in some implementations, generating a voice activity indicator includes normalizing a function of the difference between the first value and the second value. To that end, in some implementations, the voice activity indicator calculation and buffer module 413 includes a set of instructions 413*a* and heuristics and metadata 413*b*.

In some implementations, the voice activity detection decision module 414 is configured to determine using the voice activity indicator whether or not voiced sound is present in the audible signal, and provides an indicator of the determination. For example, voice activity detection decision module 414 makes the determination by assessing whether or not the first voice activity indicator value breaches a threshold level ($M_t$). To that end, in some implementations, the voice activity detection decision module 414 includes a set of instructions 414*a* and heuristics and metadata 414*b*.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of detecting voice activity in an audible signal, the method comprising:

at a voice activity detection system configured to detect voice activity in an audible signal by determining a normalized difference between first and second values generated from a candidate pitch associated with voiced sounds, the voice activity detection system including one or more audio sensors:

selecting the candidate pitch from a plurality of predetermined candidate pitches, wherein the plurality of predetermined candidate pitches are generated independent from the audible signal;

generating the first value associated with a first plurality of frequencies in the audible signal, wherein each of the first plurality of frequencies is a multiple of the candidate pitch;

generating the second value associated with a second plurality of frequencies in the audible signal, wherein each of the second plurality of frequencies is associated with a corresponding one of the first plurality of frequencies; and generating a first voice activity indicator value, associated with the audible signal, as a function of the first value and the second value.

2. The method of claim 1, wherein the candidate pitch is an estimation of a dominant frequency characterizing a corresponding series of glottal pulses associated with the voiced sounds.

3. The method of claim 1, wherein one or more of the second plurality of frequencies is characterized by a frequency offset relative to a corresponding one of the first plurality of frequencies.

4. The method of claim 1, further comprising receiving the audible signal from the one or more audio sensors.

5. The method of claim 1, further comprising pre-emphasizing portions of a time series representation of the audible signal in order to adjust the spectral composition of the audible signal.

6. The method of claim 1, wherein:

generating the first value includes calculating a first sum of a plurality of first amplitude spectrum values of the audible signal, wherein each of the plurality of first amplitude spectrum values is a corresponding amplitude of the audible signal at a respective one of the first plurality of frequencies; and generating the second value includes calculating a second sum of a plurality of second amplitude spectrum values of the audible signal, wherein each of the plurality of second amplitude spectrum values is a corresponding amplitude of the audible signal at a respective one of the second plurality of frequencies.

7. The method of claim 6, wherein calculating at least one of the first and second sums includes calculating a respective weighted sum, wherein amplitude spectrums values are multiplied by respective weights.

8. The method of claim 7, wherein the respective weights are one of substantially monotonically increasing, substantially monotonically decreasing, substantially binary in order to isolate one or more spectral sub-bands, spectrum dependent, non-uniformly distributed, empirically derived, derived using a signal-to-noise metric, and substantially fit a probability distribution function.

9. The method of claim 1, wherein generating the first voice activity indicator value includes normalizing a function of the difference between the first value and the second value.

10. The method of claim 9, wherein normalizing the difference between the first value and the second value comprises one of:

dividing the difference by a function of the sum of the first value and the second value;

dividing the difference by a function of an integral value of the spectrum amplitude of the audible signal over a first frequency range that includes the candidate pitch.

11. The method of claim 1, wherein the plurality of predetermined candidate pitches are included in a frequency range associated with the voiced sounds.

12. The method of claim 11 further comprising:

generating an additional respective voice activity indicator value for each of one or more additional candidate pitches, of the plurality of predetermined candidate pitches, in order to produce a plurality of voice activity indicator values including the first voice activity indicator value; and selecting one of the plurality of predetermined candidate pitches based at least on one of the plurality of voice activity indicator values that is distinguishable from the others, wherein the selected one corresponds to one of the plurality of predetermined candidate pitches that is detectable in the audible signal.

13. The method of claim 11, wherein the distinguishable voice activity indicator value more closely satisfies a criterion than the other voice activity indicator values.

14. The method of claim 11, wherein one of the plurality of predetermined candidate pitches is selected for each of a plurality of temporal frames using a corresponding plurality of voice activity indicator values for each temporal frame.

15. The method of claim 11, wherein the selected one of the plurality of candidate voice frequencies provides an indicator of a pitch of a detectable voiced sound in the audible signal.

16. The method of claim 1, wherein one or more additional voice activity indicator values are generated for a corresponding one or more additional temporal frames.

17. The method of claim 1 further comprising:

comparing the first voice activity indicator value to a threshold level; and determining that voice activity is detected in response to ascertaining that the first voice activity indicator value breaches the threshold level.

18. A method of detecting voice activity in a signal, the method comprising:

at a voice activity detection system configured to detect voice activity in an audible signal by determining a normalized difference between first and second characterization values generated from a candidate pitch associated with voiced sounds, the voice activity detection system including one or more audio sensors:

selecting the candidate pitch from a plurality of predetermined candidate pitches, wherein the plurality of predetermined candidate pitches are generated independent from the audible signal;

generating a plurality of temporal frames of the audible signal, wherein each of the plurality of temporal frames includes a respective temporal portion of the audible signal; and generating a plurality of voice activity indicator values corresponding to the plurality of temporal frames of the audible signal, each voice activity indicator value being determined by a function of a respective first and second spectrum characterization values associated with one or more multiples of the candidate pitch.

19. The method of claim 18, further comprising determining whether or not voice activity is present in one or more of the plurality of temporal frames by evaluating one or more of the plurality of voice activity indicator values with respect to a threshold value.

20. The method of claim 18, wherein determining the function of the respective first and second spectrum characterization values includes normalizing a function of the difference between the first characterization value and the second characterization value.

21. The method of claim 18 further comprising:

generating the respective first spectrum characterization value associated with a first plurality of frequencies in the respective temporal frame of the audible signal, each of the first plurality of frequencies being a multiple of the candidate pitch; and generating the respective second spectrum characterization value associated with a second plurality of frequencies in the respective temporal frame of the audible signal, wherein each of one or more of the second plurality of frequencies is associated with a corresponding one of the first plurality of frequencies.

22. The method of claim 18, wherein the plurality of temporal frames sequentially span a duration of the audible signal.

23. A voice activity detector, configured to detect voice activity in an audible signal by determining a normalized difference between first and second values generated from a candidate pitch associated with voiced sounds, the voice activity detector comprising:

one or more audio sensors;

a processor; and a non-transitory memory including instructions that, when executed by the processor, cause the voice activity detector to:

select the candidate pitch from a plurality of predetermined candidate pitch, wherein the plurality of predetermined candidate pitches are generated independent from the audible signal;

generate the first value associated with a first plurality of frequencies in the audible signal, each of the first plurality of frequencies being a multiple of the candidate pitch;

generate the second value associated with a second plurality of frequencies in the audible signal, wherein each of one or more of the second plurality of frequencies is associated with a corresponding one of the first plurality of frequencies; and generate a first voice activity indicator value, associated with the audible signal, as a function of the first value and the second value.

24. A voice activity detector, configured to detect voice activity in an audible signal by determining a normalized difference between first and second values generated from a candidate pitch associated with voiced sounds, the voice activity detector comprising:

one or more audio sensors;

a candidate pitch selection module configured to select the candidate pitch from a plurality of predetermined candidate pitches, wherein the plurality of predetermined candidate pitches are generated independent from the audible signal;

a windowing module configured to generate a plurality of temporal frames of the audible signal, wherein each temporal frame includes a respective temporal portion of the audible signal; and a signal analysis module configured to generate a plurality of voice activity indicator values corresponding to the plurality of temporal frames of the audible signal, each voice activity indicator value being determined by a function of a respective first and second spectrum characterization values associated with one or more multiples of the candidate pitch.

25. The voice activity detector of claim 24, further comprising a decision module configured to determine whether or not voice activity is present in one or more of the plurality of temporal frames of the audible signal by evaluating one or more of the plurality of voice activity indicator values with respect to a threshold value.

26. The voice activity detector of claim 24, further comprising a frequency domain transform module configured to produce a respective frequency domain representation of one or more of the plurality temporal frames of the audible signal.

27. The voice activity detector of claim 24, further comprising a spectral filter module configured to condition a respective frequency domain representation of one or more of the plurality temporal frames of the audible signal.

28. The voice activity detector of claim 24, wherein the signal analysis module is further configured to determine the function of the respective first spectrum characterization value and the respective second spectrum characterization value by normalizing a function of the difference between the first value and the second value.

29. The voice activity detector of claim 24, wherein the signal analysis module is further configured to:

calculate the respective first spectrum characterization value associated with a first plurality of frequencies in the respective temporal frame of the audible signal, each of the first plurality of frequencies being a multiple of the candidate pitch; and calculate the respective second spectrum characterization value associated with a second plurality of frequencies in the respective temporal frame of the audible signal, wherein each of one or more of the second plurality of frequencies is associated with a corresponding one of the first plurality of frequencies.

30. A voice activity detector, configured to detect voice activity in an audible signal by determining a normalized difference between first and second values generated from a candidate pitch associated with voiced sounds, the voice activity detector comprising:

one or more audio sensors;

means for selecting the candidate pitch from a plurality of predetermined candidate pitches, wherein the plurality of predetermined candidate pitches are generated independent from the audible signal;

means for dividing the audible signal into a corresponding plurality of temporal frames, wherein each temporal frame includes a respective temporal portion of the audible signal; and means for generating a plurality of voice activity indicator values corresponding to the plurality of temporal frames of the audible signal, each voice activity indicator value being determined by a function of a respective first and second spectrum characterization values associated with one or more multiples of the candidate pitch.

31. A method of detecting voice activity in an audible signal, the method comprising:

at a voice activity detection system configured to detect voice activity in an audible signal by determining a normalized difference between first and second values generated from a candidate pitch associated with voiced sounds, the voice activity detection system including one or more audio sensors:

selecting the candidate pitch from a plurality of predetermined candidate pitches, wherein the plurality of predetermined candidate pitches are generated independent from the audible signal;

generating the first value associated with a first plurality of spectral components in the audible signal, wherein each of the first plurality of spectral components is associated with a respective multiple of the candidate pitch;

generating the second value associated with a second plurality of spectral components in the audible signal, wherein each of the second plurality of spectral components is associated with a corresponding one of the first plurality of spectral components; and generating a first voice activity indicator value, associated with the audible signal, as a function of the first value and the second value.

* * * * *